Nov. 10, 1931.  B. H. SKELLY  1,831,612
EGG BOILER
Filed Nov. 4, 1930   3 Sheets-Sheet 1
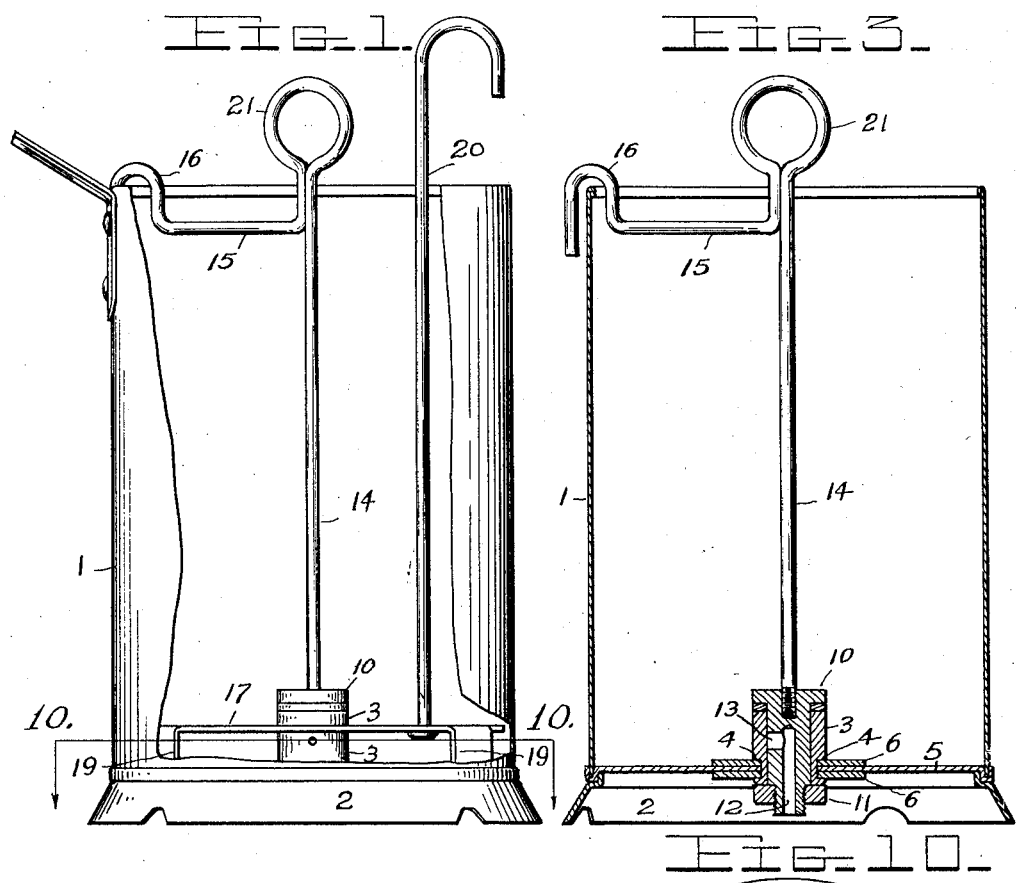
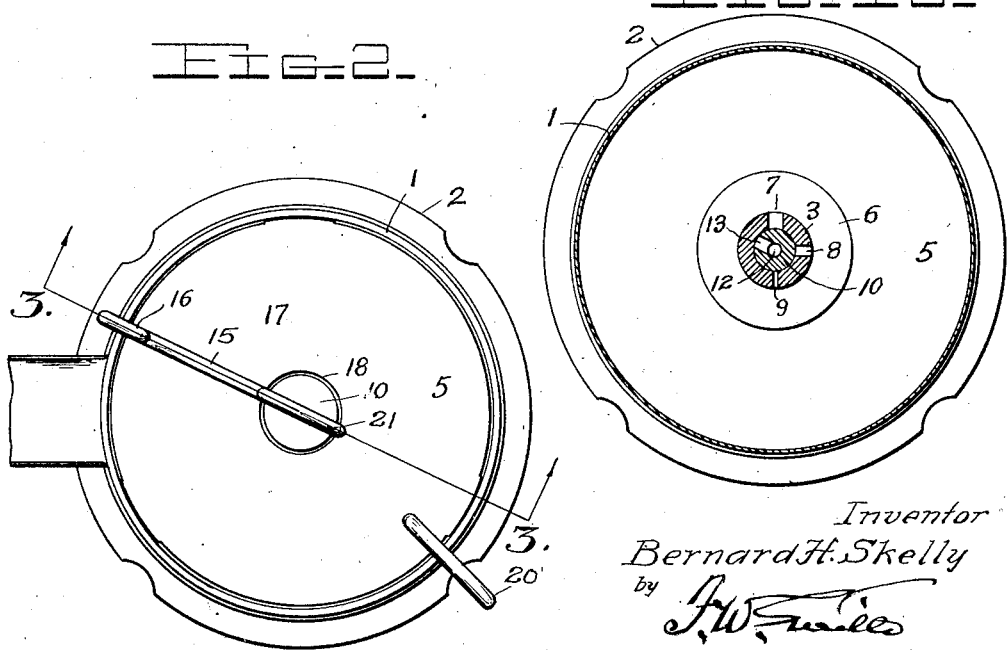
Inventor
Bernard H. Skelly
by
Attorney

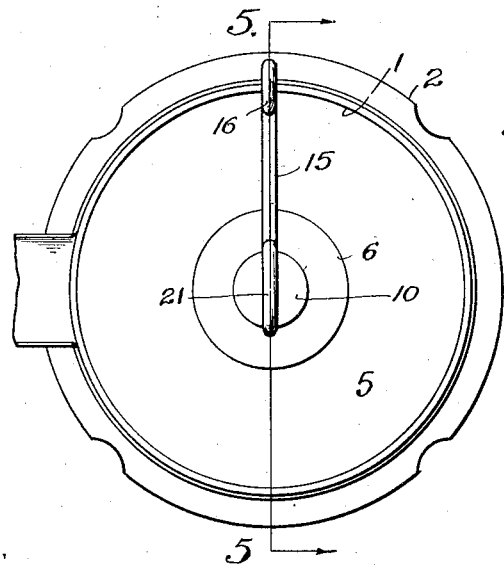
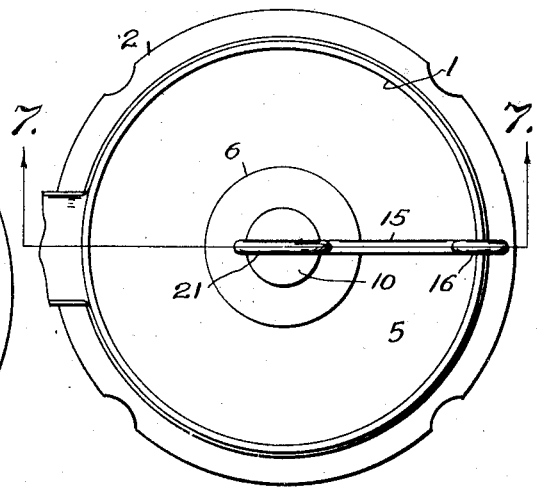
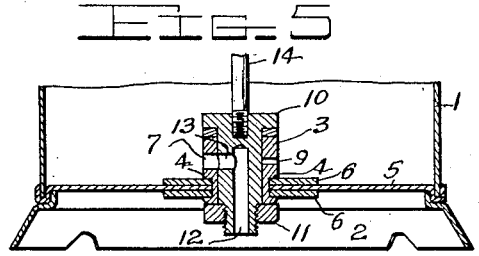
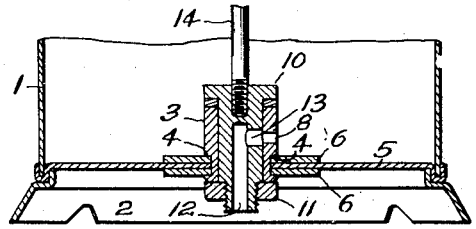
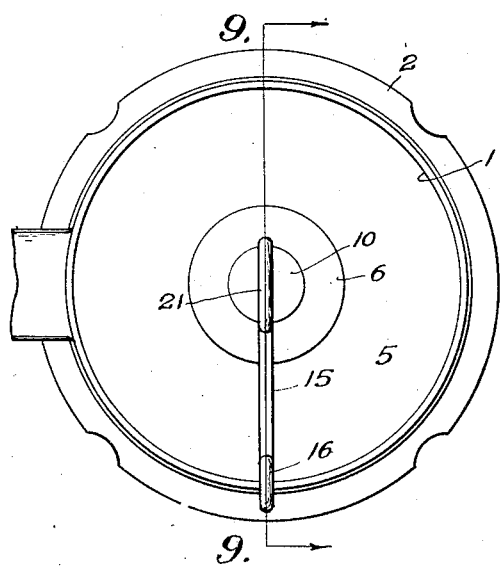
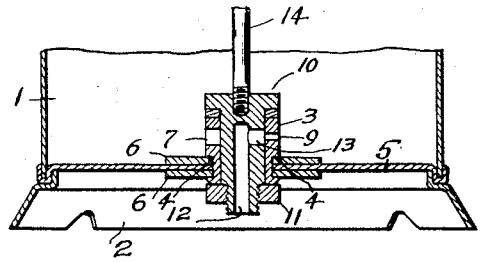

Nov. 10, 1931.  B. H. SKELLY  1,831,612
EGG BOILER
Filed Nov. 4, 1930  3 Sheets-Sheet 3
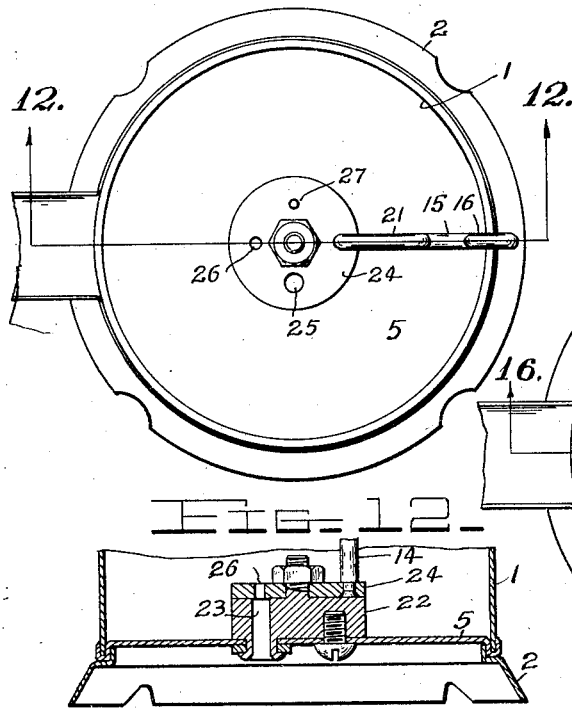
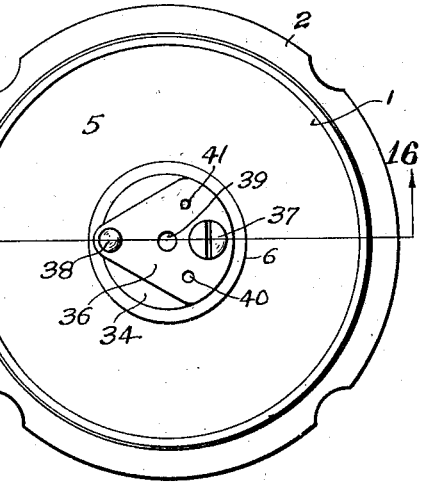
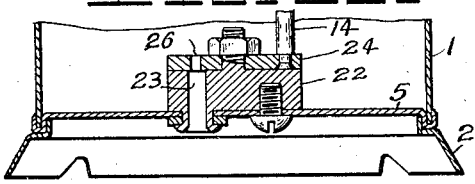
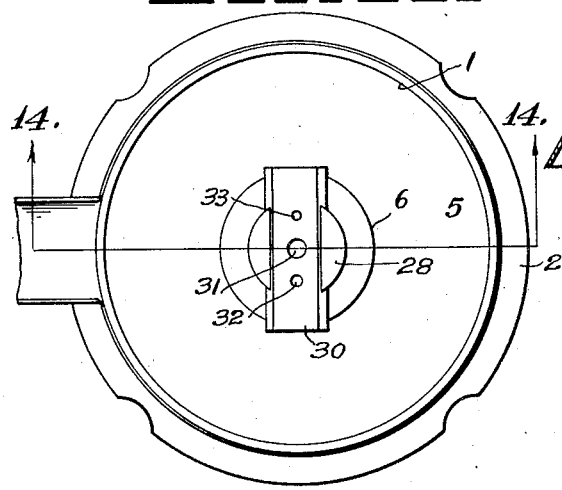
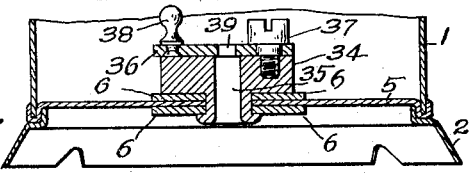
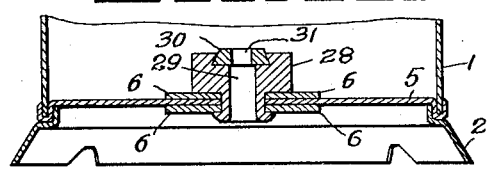
*Inventor*
*Bernard H. Skelly*
by
*Attorney*

Patented Nov. 10, 1931

1,831,612

UNITED STATES PATENT OFFICE

BERNARD H. SKELLY, OF BRIDGEPORT, CONNECTICUT

EGG BOILER

Application filed November 4, 1930. Serial No. 493,296.

My invention relates to egg boilers, and has for its object to cook an egg to a soft, medium or hard boiled state, without any attention as to time on the part of the cook.

With this end in view my invention consists in subjecting the egg to the action of boiling water throughout a period of time that is automatically predetermined by the degree to which the egg is to be cooked.

The accompanying drawings illustrate a preferred exemplification of my invention, and in these drawings, Figure 1 is a side elevation, partly broken, of an apparatus for carrying out my invention—

Figure 2 is a plan view—

Figure 3 is a section at line 3—3 of Figure 2—

Figure 4 is a view similar to Figure 2, but with the control arm positioned for a soft boiled egg—

Figure 5 is a section at line 5—5 of Figure 4—

Figure 6 is also a view similar to Figure 2, but with the control arm positioned for boiling the egg medium—

Figure 7 is a section at line 7—7 of Figure 6—

Figure 8 is likewise a view similar to Figure 2, but with the control arm positioned for boiling an egg hard—

Figure 9 is a section at line 9—9 of Figure 8—

Figure 10 is a section at line 10—10 of Figure 1—

Figures 11, 13 and 15, are plan views of modifications of the invention, and

Figures 12, 14 and 16, are respectively sections at the lines 12—12, 14—14 and 16—16, of Figures 11, 13 and 15.

Similar numerals of reference denote like parts in the several figures of the drawings.

Referring to Figures 1 to 10 inclusive, which show the preferred form of my invention, 1 is a receptacle having a base 2. 3 is a hollow open ended sleeve or bushing whose lower end has a shoulder 4 and extends through the bottom 5 of the receptacle, and washers 6 around this end above and below said bottom are clamped to the latter by spinning the periphery of said end firmly against the lower washer, so as to make a water tight connection between this sleeve and the bottom 5.

This sleeve has lateral openings 7, 8 and 9 in the same horizontal plane but of different sizes, the opening 7 being the largest, the opening 8 somewhat smaller, and the opening 9 the smallest.

10 is a valve or plug that fits snugly within the sleeve 3 and extends through the latter so as to project there below, this projecting part being reduced in diameter and threaded externally, a nut 11 being driven on this threaded portion to secure said plug as against any movement except rotation.

This plug is hollow and open at the bottom as seen at 12, and a large discharge opening 13 leads laterally from the portion 12 through the plug, this opening being in the same horizontal plane with the openings 7, 8, 9.

14 is a vertical spindle that is secured at its lower end to the plug or valve 10, and this spindle terminates at its upper end in what I term a "control arm" 15 that extends radially from the spindle and has a hooklike formation 16 at its end which engages over the rim of the receptacle.

When this arm 15 is in the position shown at Figures 1, 2, 3 and 10, none of the openings 7, 8 and 9 in the sleeve will be in alinement with the large opening 13 in the valve 10, and the receptacle will then be watertight and may be used for other culinary purposes.

When the control arm is swung to the position shown at Figures 4 and 5, the largest opening 7 will be in alinement with the discharge opening 13, and when said arm is swung to the position shown at Figures 6 and 7, the medium sized opening 8 will be alined with the discharge opening, and the position of the control arm shown at Figures 8 and 9 will bring the smallest opening 9 in alinement with the discharge opening.

If the receptacle be filled with boiling water and an egg placed in the water with the parts in position as shown at Figures 4 and 5, the water will be discharged from the receptacle in a comparatively short time, the sizes of all the openings 7, 8, 9, and 13, as well as the size of the receptacle being predetermined, so that it is known that when the receptacle is empty, the egg will have been subjected to the action of the boiling water for a time to cook it to the degree desired, and in the instance noted at the beginning of this paragraph the receptacle will be emptied in four minutes and the egg will be soft boiled.

Following this analogy, with the parts in the positions shown at Figures 6 and 7 and Figures 8 and 9, the receptacle will be emptied in 5 or 8 minutes and the egg would be respectively medium and hard boiled.

These time durations are in no sense to be taken as limitations, as they may vary widely according to the capacity of the receptacle and the sizes of the various openings referred to, and they are only mentioned as examples in the abstract.

In carrying out my invention, the receptacle is filled with boiling water and the egg or eggs immediately placed therein.

In order to prevent accidental cracking of the eggs, I have provided a very simple means which is only illustrated in Figures 1 and 2, and which I will now describe.

17 is a disk loosely fitting within the receptacle and having a central opening 18 which normally surrounds the sleeve and has legs 19 that rest on the bottom of the receptacle. A lift rod 20 secured to this disk is utilized to raise the latter, so that eggs may be deposited thereon, and then to lower it so that the eggs will not come in contact with anything that would crack them.

This disk may, of course, be dispensed with and the eggs placed in the boiling water in any desired manner.

It will thus be seen that, when the control arm is properly positioned, a cook need not be concerned with underboiling or overboiling since this is impossible.

The spindle 14 that terminates in what has been termed the "control arm" is preferably formed so as to provide a suitable finger and thumb grip 21 for swinging the arm, but this is not essential.

Also, any means, within the range of ordinary mechanical genius may be utilized for revolving the plug or valve, and the latter may even be turned by hand before the water is introduced.

It is not necessary that the discharge opening and the small, medium and large openings should be disposed as hereinbefore described, and therefore, referring particularly to Figures 11 to 16 inclusive, I will describe several simple modifications of my invention, all of which, however, so far as the discharge of the water from the receptacle is concerned, contemplate a stationary member and a member movably associated therewith, one of the members having an opening for discharging the water, while the other member has openings of different sizes which are selectively alined with the discharge opening, whereby the water is discharged from the receptacle in predetermined periods of time, just as in the structures heretofore described with reference to Figures 1 to 10 inclusive.

Referring to Figures 11 and 12, 22 is a stationary member which corresponds with the sleeve 3, and is secured to the bottom of the receptacle in any suitable manner, which, in the present instance, is so evident from the drawings as to require no description, and this member has extending therethrough from top to bottom a discharge opening 23. Pivoted on top of the member 22 is a rotary member 24 to which is preferably secured the vertical spindle 14 as and for the purpose hereinbefore described, and this rotary member has extending therethrough a large opening 25, a medium opening 26, and a small opening 27, and by rotation of this member 24 these openings are respectively brought into alinement with the discharge opening 23, so that the receptacle may be emptied of the boiling water in predetermined times just as hereinbefore described.

Referring to Figures 13 and 14, 28 is a stationary member which is secured to the bottom of the receptacle and has a discharge opening 29 extending therethrough from top to bottom. 30 is a member adapted to slide within suitable ways in the member 28, and this slide is provided with a large opening 31, a medium opening 32, and a small opening 33, and by sliding the member 30 these openings are caused to aline with the discharge opening 29 as and for the purposes hereinbefore described.

Referring to Figures 15 and 16, 34 is a stationary member secured to the bottom of the receptacle in any suitable manner, and is provided with a discharge opening 35 extending therethrough from top to bottom. 36 is a member pivoted at 37 to the member 34, and provided with a knob 38 whereby this member 36 may be swung from its pivotal point, and this member is provided with a large opening 39, a medium opening 40, and a small opening 41, which openings are concentrically disposed with respect to the pivot 37 so that when the member 36 is swung the openings in said member will be alined with the discharge opening 35 just as in the instance heretofore described.

From the above it will be readily understood that it is immaterial whether the registering openings are disposed laterally or vertically, and that the same process of boiling the eggs obtains in the instances of all the constructions heretofore described.

What is claimed is:—

1. An egg boiler, comprising a receptacle for receiving boiling water within which the egg is placed, a hollow cylindrical seat secured to the bottom of said receptacle and having a plurality of different sized lateral ports leading therein from said receptacle, a hollow outlet plug rotatably secured within said seat and having a comparatively large lateral opening leading into said outlet, and means attached to said plug and extending above the upper edge of the receptacle for rotating said plug to bring said opening into alinement with said ports.

2. An egg boiler, comprising a receptacle for receiving boiling water, a stationary member secured to the bottom of the receptacle, a member movably connected with respect to said stationary member, one of said members having an opening for discharging the water, and the other member having openings of different sizes, means connected to the movable member and extending above the edge of the receptacle for selectively bringing the openings of different sizes into alinement with said discharge opening, whereby the water is discharged from the receptacle in predetermined periods of time.

In testimony whereof I affix my signature hereto.

BERNARD H. SKELLY.